United States Patent
Oberg et al.

(10) Patent No.: US 8,409,006 B2
(45) Date of Patent: Apr. 2, 2013

(54) HANDHELD DEVICE WIRELESS MUSIC STREAMING FOR GAMEPLAY

(75) Inventors: Gregory Keith Oberg, Troy, NY (US); Jesse Nathaniel Booth, Schoharie, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 1313 days.

(21) Appl. No.: 11/864,785

(22) Filed: Sep. 28, 2007

(65) Prior Publication Data

US 2009/0088247 A1 Apr. 2, 2009

(51) Int. Cl.
*A63F 9/24* (2006.01)
(52) U.S. Cl. .......................................... 463/42
(58) Field of Classification Search ............. 463/35, 463/42
See application file for complete search history.

(56) References Cited

U.S. PATENT DOCUMENTS

| | | | |
|---|---|---|---|
| 5,471,009 A * | 11/1995 | Oba et al. ............... | 84/645 |
| 5,806,849 A | 9/1998 | Rutkowski | |
| 6,212,359 B1 | 4/2001 | Knox | |
| 6,353,174 B1 | 3/2002 | Schmidt et al. | |
| 6,482,087 B1 | 11/2002 | Egozy et al. | |
| 6,506,969 B1 * | 1/2003 | Baron ............... | 84/609 |
| 6,757,517 B2 | 6/2004 | Chang | |
| 6,757,913 B2 | 6/2004 | Knox | |
| 7,051,047 B2 | 5/2006 | Jung et al. | |
| 7,143,939 B2 | 12/2006 | Henzerling | |
| 7,231,176 B2 | 6/2007 | Levy | |
| 7,236,739 B2 | 6/2007 | Chang | |
| 7,275,994 B2 | 10/2007 | Eck et al. | |
| 7,560,636 B2 * | 7/2009 | Wolfram ............... | 84/609 |
| 7,589,727 B2 * | 9/2009 | Haeker ............... | 345/440 |
| 2002/0169014 A1 | 11/2002 | Egozy et al. | |
| 2005/0286546 A1 | 12/2005 | Bassoli et al. | |
| 2007/0163428 A1 | 7/2007 | Salter | |
| 2007/0243915 A1 | 10/2007 | Egozy et al. | |
| 2007/0245881 A1 | 10/2007 | Egozy et al. | |
| 2008/0113797 A1 * | 5/2008 | Egozy ............... | 463/35 |

OTHER PUBLICATIONS

"Nintendo DS Lite", Instruction Booklet, Nintendo of America Inc., 2006, 15 pages.
International Search Report from International Searching Authority dated May 26, 2009 for corresponding PCT Application No. PCT/US2008/077957.
Written Opinion from International Searching Authority dated May 26, 2009 for corresponding PCT Application No. PCT/US2008/077957.

* cited by examiner

*Primary Examiner* — Corbett B Coburn
(74) *Attorney, Agent, or Firm* — Klein, O'Neill & Singh, LLP

(57) ABSTRACT

Systems and methods are disclosed for streaming of audio data of separate streams in at least two different formats. In some embodiments handheld game devices are in wireless communication and a first of the handheld game devices streams audio data during game play to a second of the handheld game devices. In some embodiments the audio data includes audio data from a plurality of streams of audio data. In some embodiments the streams of audio data include streams of audio data in different formats, generally different compressed formats, some of which may be selected based on whether a device includes circuitry specifically configured to decompress audio data in a specific data format.

9 Claims, 12 Drawing Sheets

HANDHELD DEVICE WIRELESS MUSIC STREAMING FOR GAMEPLAY

BACKGROUND OF THE INVENTION

The present invention relates generally to streaming music over a wireless connection, and more particularly to streaming music over a wireless connection between two handheld video game devices.

Handheld video game devices provide a convenient platform for enjoyment of video game play by many. The small form factor allows for easy transport of the video game device, and for comfortable play in a wide range of environments, including those environments which may be unsuitable for video game play on console or large arcade-type devices.

Handheld game devices may also have wireless communication capability. The wireless communication capability may be convenient so as to allow a user of one device to be able to provide game programs, for example, to a handheld device of another user.

Some game programs, however, may utilize large amounts of data. For example, songs or other audio information may be provided by a game, either as background audio or as part of game play, and the songs or other audio information often may require large amounts of data, even in compressed form. Transfer of large amounts of data, however, from a provider handheld device to a recipient handheld device prior to game play may unduly delay commencement and enjoyment of the game. Moreover, storing of large quantities of transferred data by the recipient handheld device may unduly tax or exceed memory capacity of the recipient handheld device. In addition, a handheld device may face difficulties in timely processing of game play instructions while substantially simultaneously processing large amounts of data, such as audio information of songs, even if the handheld device includes specialized capability to process such audio information.

SUMMARY OF THE INVENTION

The invention provides for music streaming during game play for, for example, handheld devices. In one aspect the invention provides a method for providing audio information from a first handheld device to a second handheld device during game play of an interactive multiplayer video game engaged in by users of the first handheld device and the second handheld device, the first handheld device configured to execute program instructions of the interactive multiplayer video game and the second handheld device also configured to execute program instructions of the game, each of the first handheld device and the second handheld device having wireless communications capability, comprising: executing at least some program instructions of the interactive multiplayer video game by the first handheld device; transmission of at least some audio information by the wireless communications capability of the first handheld device; executing at least some program instructions of the interactive multiplayer video game by the second handheld device; reception by the wireless communications capability of the second handheld device of the at least some audio information transmitted by the wireless communication capability of the first handheld device, the reception occurring after the second handheld device has executed at least some of the program instructions of the interactive multiplayer video game; providing an audio presentation by the second handheld device of the at least some audio information received by the second handheld device; and executing at least some further program instructions of the interactive multiplayer video game by the first handheld device, the execution of the at least some further program instructions occurring after the transmission of the at least some audio information by the wireless communications capability of the first handheld device.

In another aspect the invention provides a method for communicating audio information between a first handheld device and a second handheld device, the method comprising: providing a first audio stream in a first data format; providing a second audio stream in a second data format, the second data format being different from the first data format; combining the first audio stream and the second audio stream into an output stream; and transmitting the output stream from the first handheld device to the second handheld device.

In another aspect the invention provides a method for communicating audio information between a first handheld device and a second handheld device, the method comprising: receiving an input stream at the second handheld device from the first handheld device, the input stream including data of a first audio stream in a first format and data of a second audio stream in a second format, the first data format and the second data format being different formats; buffering data of the first audio stream; buffering data of the second audio stream; and playing at least one sound indicative of data of the first audio stream and data of the second audio stream.

In another aspect the invention provides an audio stream transmitting system for transmitting information from a first handheld device to a second handheld device, the audio stream transmitting system comprising: a first buffer configured to receive a first audio stream in a first format; a second buffer configured to receive a second audio stream in a second format, the second data format being different from the first data format; a processor configured to combine the first audio steam and the second audio stream into an output stream; and a transmitting system configured to transmit the output stream from the first handheld device to the second handheld device.

In another aspect the invention provides An audio stream receiving system for receiving information at a second handheld device from a first handheld device, the audio stream receiving system comprising: a receiving system configured to receive an input stream from the second handheld device, where the input stream includes a first audio stream in a first format and a second audio stream in a second format, the second data format being different from the first data format; a processor configured to retrieve the first audio stream from the input stream and to store the first audio stream in a first buffer; the processor configured to retrieve the second audio stream from the input stream and to store the second audio stream in a second buffer; the processor configured to generate at least one audio signal indicative of the first audio stream and the second audio stream; and at least one speaker configured to play a sound indicative of the at least one audio signal.

These and other aspects of the invention are more fully comprehended upon study of this disclosure.

DETAILED DESCRIPTION

Figure 1:
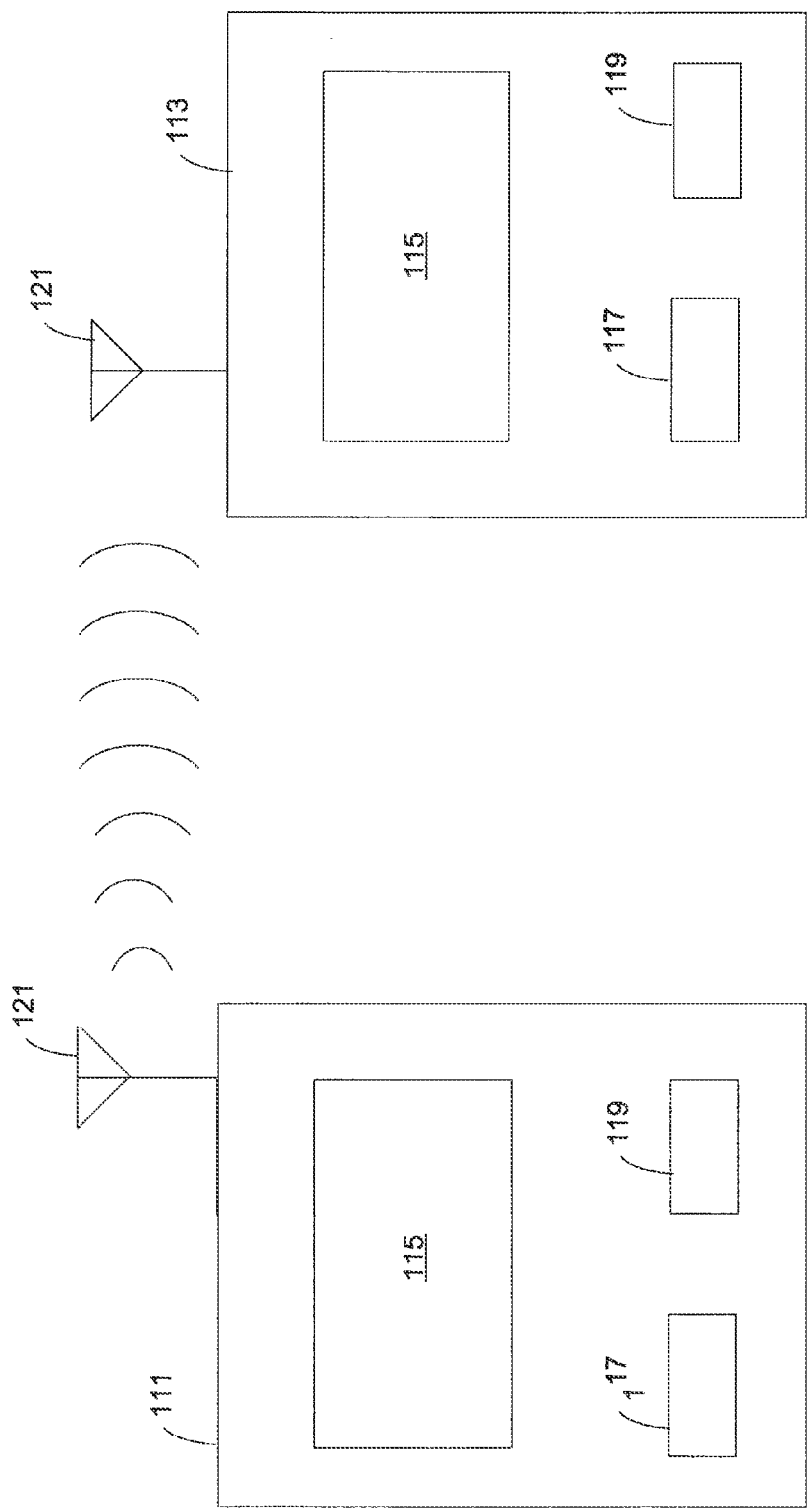
FIG. 1 illustrates two handheld game devices utilizing wireless data communication to stream audio data in accordance with aspects of the invention.

FIG. 1 illustrates a first handheld device 111 and a second handheld device 113. Both handheld devices are configured for use as handheld video game devices, with each device including a display 115 at least one user input device 117, and a speaker 119. As is often common with such devices, each device includes circuitry such as processing circuitry for executing game instructions stored in a memory associated with the processing circuitry, circuitry for receiving user inputs, circuitry for driving the display, circuitry for driving the speaker, and circuitry for reading a memory, which may be a removable memory. In addition, each device includes wireless communication circuitry for wireless communication using an antenna 121.

Generally at least one of the handheld devices is provided a removable memory, such as provided by a game cartridge, with the removable memory including the game instructions and possibly other data, such as audio information for use as part of or in conjunction with the game. The game instructions are commanded by the processing circuitry to be transferred to the memory associated with the processing circuitry as appropriate for game play.

As shown in FIG. 1, the first handheld device provides data during game play to the second handheld device. More particularly, the first handheld device provides audio information during game play to the second handheld device. Accordingly, in many embodiments the processing circuitry of the first handheld device is configured, usually by program instructions, to command transmission during game play of the audio information to the second handheld device by way of the wireless communication circuitry. The audio information, for example a song or voice clip, may be provided to the first handheld device by the removable memory in some embodiments or otherwise be provided to the first handheld device in other embodiments, for example by a microphone and associated audio circuitry or by a computer or server from which the first handheld device downloads the audio information.

In some embodiments the first handheld device provides, for example by wireless transmission such as radio frequency transmission, audio information to a plurality of other handheld devices. Thus in various embodiments the first handheld device may provide audio information to three, or eight, or some other number of other handheld devices.

In some embodiments the first handheld device provides, generally by wireless transmission, audio information during game play to the second handheld device at discrete times or upon discrete occurrences, such as upon receipt of a request by user to do so. For example, audio information comprising a voice message may be provided by the first handheld device to the second handheld device at predefined times during game play, or upon a request by a user of the first handheld device to do so.

In many embodiments, however, the audio information is provided by the first handheld device during game play as a stream, with the audio information provided in a substantially continuous manner or sufficiently continuous that the second handheld device may temporarily buffer some portions of the audio information to account for some discontinuities in receipt of the audio information. The stream of audio information may be provided throughout game play or be provided during discrete portions of game play.

Figure 11:
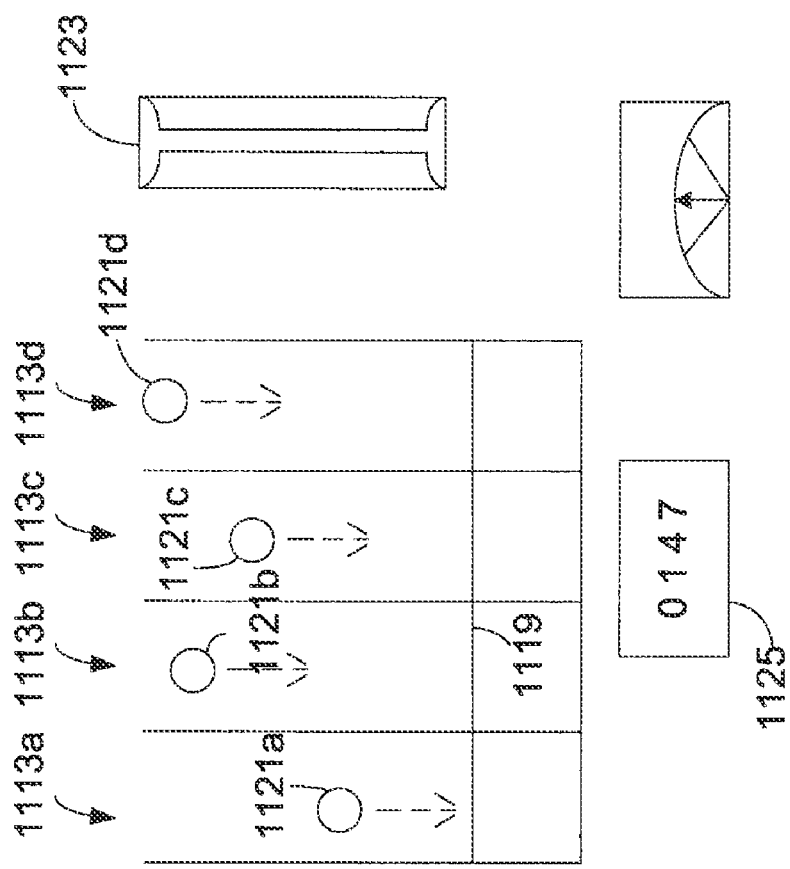
FIG. 11 is a screen shot of a display of an example music game in accordance with aspects of the invention.

As an example, audio information comprising a song, or tracks of a song, may be provided by the first handheld device to the second handheld device during game play of a game such as a music game. The music game may be a music game in which users of handheld devices attempt to operate the handheld devices, or input devices data coupled to the handheld devices, in conjunction with audio presentation of the song or in response to actuation instructions on a display of the handheld devices. FIG. 11 shows a sample screen shot of a display in an example music game. In the example music game, graphical symbols scroll, or follow similar paths, shown in columnar format, across the display. As illustrated the sample screen shot of FIG. 11 shows four graphical symbols 1121a-d, each scrolling across the display in adjacent columnar paths 1113a-d. Audio presentation of the song is provided as the graphical symbols scroll across the screen. As each graphical symbol reaches a predefined portion of the display, such as the portion indicated by action line 1119, the user is expected to operate predetermined one or more input devices, with a graphical symbol in a particular path denoting that at least one particular input device, or combination of input devices, should be operated. In addition, as each graphical symbol may be considered as having some correspondence to a note, other portion of the song or other audio output, corresponding audio presentation of the notes or portions of the song is provided if the user correctly operates the input devices. Thus, through operation of the input devices, the user may "play" the song on the handheld device. In various embodiments, users of handheld devices in wireless data communication may play the same song in a collaborative or competitive manner, with audio information of the song being provided during game play from a first of handheld devices to a second of the handheld devices.

Figure 12:
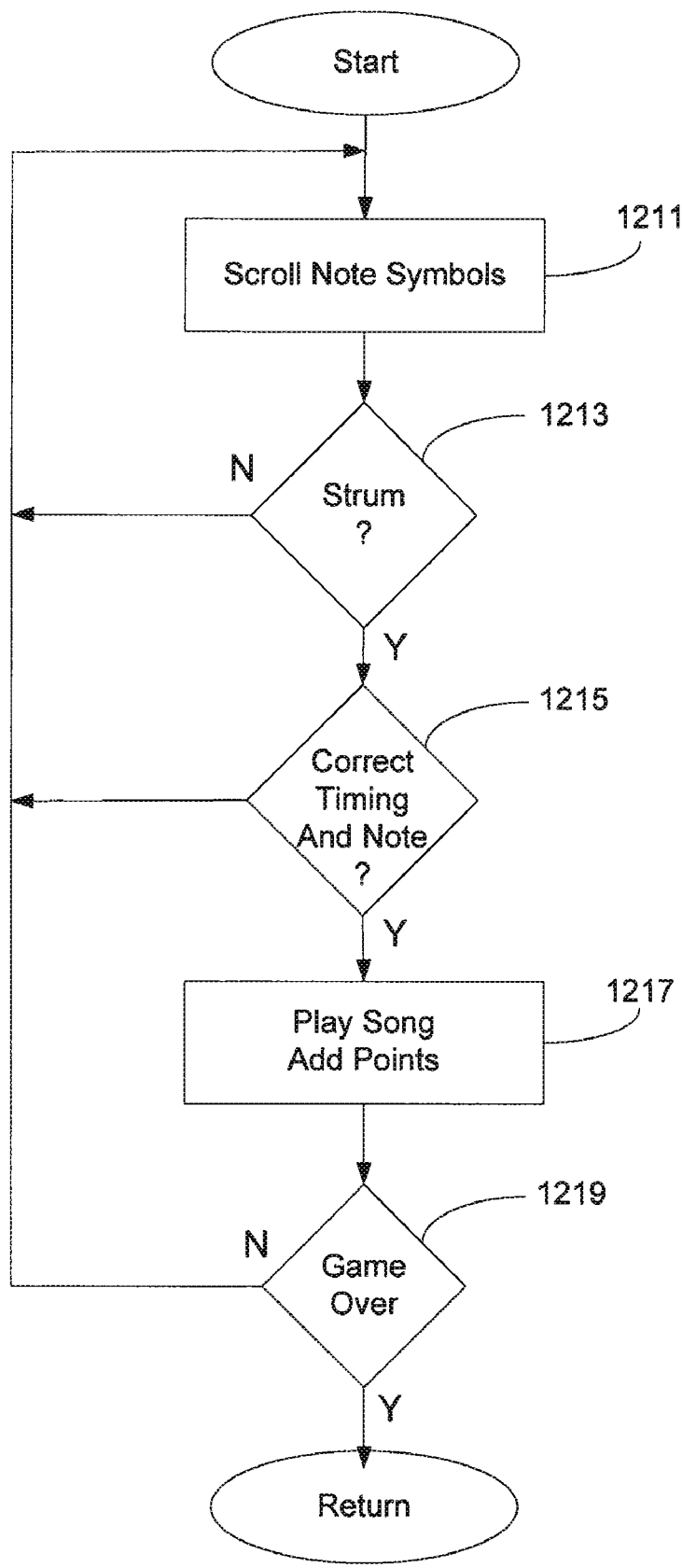
FIG. 12 is a flow diagram of an example music game in accordance with aspects of the invention.

FIG. 12 is a flow diagram of a process of a music game in accordance with aspects of the invention. The music game may be, for example, the example music game discussed with respect to FIG. 11. In block 1211 the process scrolls graphical symbols, representing notes, portions of a song, or other audio output, across a display. The process may also perform audio presentation of portions of the song in block 1211. In most embodiments the process also has a first handheld device provide audio information of portions of the song, for example portions of the song represented by the graphical symbols, and related portions of the song, to a second handheld device, which receives, and buffers the audio information until play. In block 1213 the process determines if an input representative of a strum, for example representative of a strum of a guitar, is detected. If not, the process returns to block 1211. Otherwise in block 1215 the process determines if the input has a proper timing relationship to an instruction to a user, for example as discussed with respect to FIG. 11 when a graphical symbol representing a note has reached the action line. Also in block 1215 the process determines if other inputs are in appropriate states with respect to the instruction to the user, for example that predefined input devices are in an appropriate state considering the columnar path of the note which has reached the action line. Both determinations can be considered a determination as to whether the correct "note" was played at the correct time. If the correct "note" was not played at the correct time the process returns to block 1211. If the correct "note" was played at the correct time, in block 1217 the process provides an audio presentation of the corresponding note or portion of the song and adjusts a point score of the user, generally by adding points to the user's point score. The process determines if the game is over in block 1219 (although it should be recognized that the process may do so with respect to other blocks of the process). If so, the process returns, otherwise the process goes to block 1211.

In some embodiments different portions of the audio information are provided in different data formats, often compressed data formats. For example, the audio information may be provided as three separate audio tracks, with two of the audio tracks in one data format, such as an Ogg Vorbis (Ogg) data format, and one of the audio tracks in another data format, such as an adaptive differential pulse code modulation (ADPCM) data format. Thus, during game play, for example of a music game in which users of the first and second handheld devices attempt to interact with their handheld devices in conjunction with music, the first handheld device may stream audio information of a song to the second handheld device during game play, two tracks of audio information of the song in Ogg format and one track of audio information of the song in ADPCM format. Each of the tracks of the audio information of the song may be streamed substantially simultaneously, for example with data of each track of the audio information interleaved as appropriate, possibly with other data as well. Moreover, a data format of at least one of the tracks may be selected to be the same as a data format for which the second handheld device has specialized audio processing circuitry, thereby potentially reducing processing burdens on other processing circuitry of the second handheld device.

Figure 2:
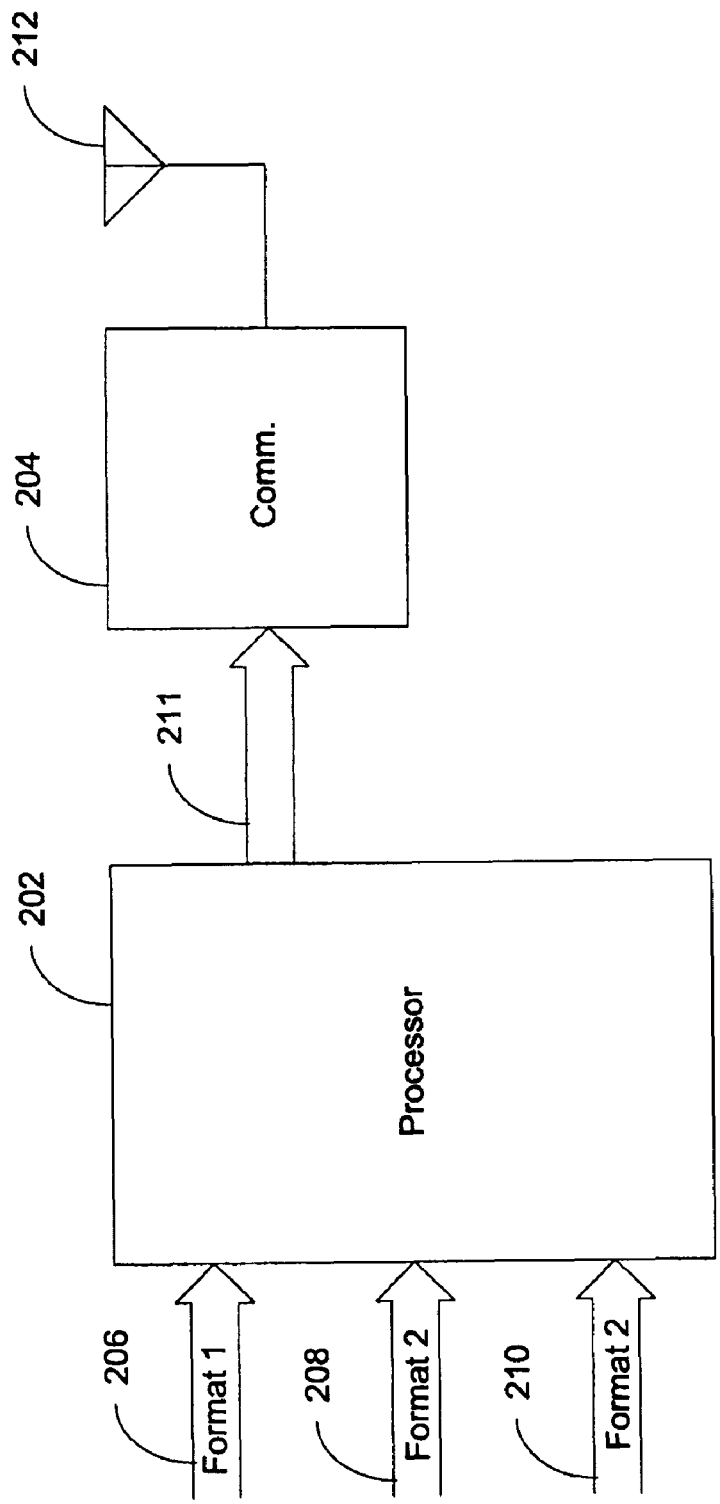
FIG. 2 is a block diagram of host circuitry relating to streaming of audio data in different formats in accordance with aspects of the invention.

FIG. 2 is a block diagram of an embodiment of circuitry associated with provision of streams of audio information in accordance with aspects of the invention. The circuitry may be provided, for example, in a handheld device such as that of FIG. 1 or other handheld devices. The circuitry includes a processing system 202 and a wireless communication system 204. The processing system 202 receives three streams of audio information 206, 208, 210 and provides a combined stream of audio information 211, which includes data of the three streams of audio information 206, 208, 210. The first stream of audio information 206 is in a first data format, while the second stream of audio information 208 and the third stream of audio information 210 are in a second data format. The processing system may receive data of the three streams of audio information from a memory, such as a removable memory coupled to a handheld device, with the data stored in the removable memory as separate tracks in the separate data formats. Alternatively, data of the three streams of audio information may be stored in a one of the formats, or another format, and converted as appropriate to the formats of the three streams of audio information by the processing system.

The wireless communication system 204 receives the combined stream of audio information 211, which includes data of the three streams of audio information 206, 208, 210. The wireless communication system 204 includes circuitry for performing wireless communication, generally including circuitry for formatting data for transmission, upconverting the data to a transmission frequency, and transmitting the data using an antenna 212. In one embodiment, communication system 204 is configured to communicate wirelessly in accordance with an IEEE 802.11 standard for wireless networks, for example as in a Wi-Fi network. In other embodiments, the communication system can communicate wirelessly using other proprietary or standard protocols.

Figure 3:
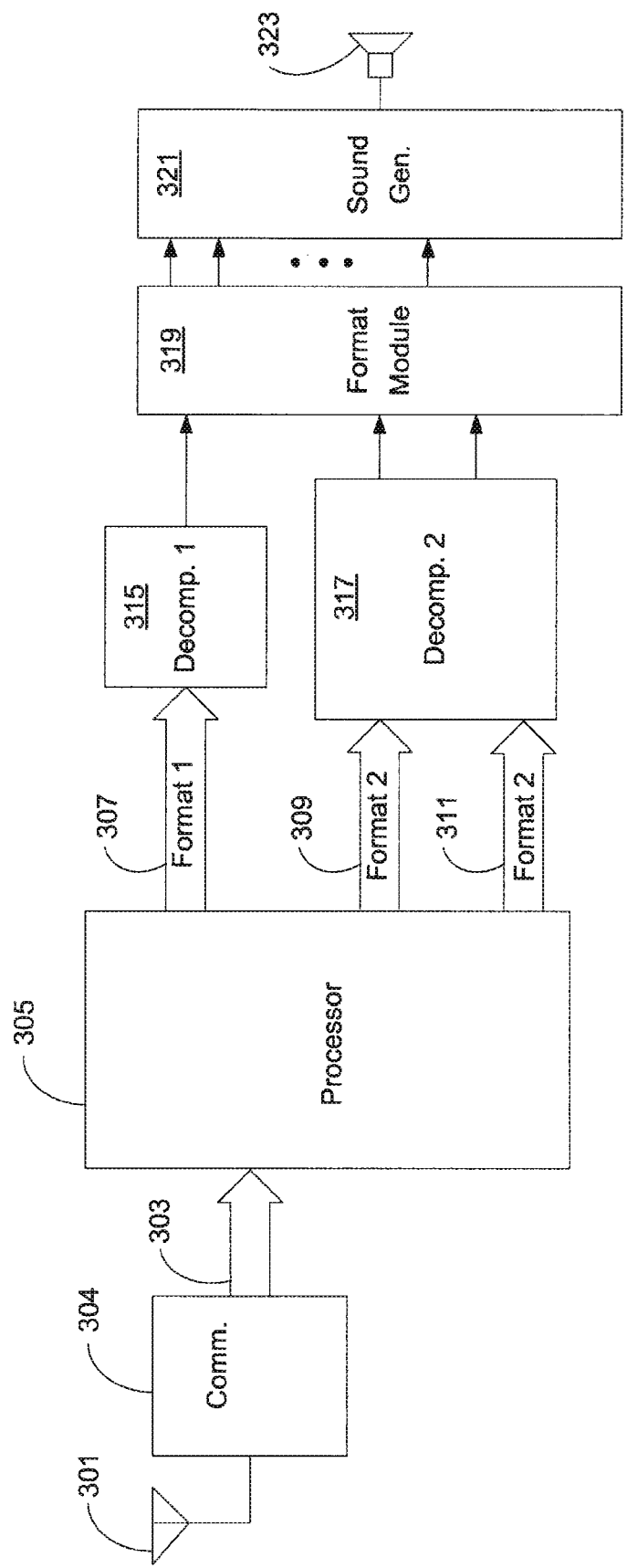
FIG. 3 is a block diagram of client circuitry relating to receiving and playing streams of audio data in accordance with aspects of the invention.

FIG. 3 is a schematic block diagram of circuitry associated with reception of streams of audio information, for example streams of audio information such as provided by the circuitry of FIG. 2, in accordance with aspects of the invention. The circuitry may be provided, for example, as part of the handheld device of FIG. 1 or as part of other handheld devices. The circuitry includes a wireless communication system 304, a processor 305, a first buffer 315, a second buffer 317, a format module 319, a sound generator 321 and a speaker 323. The wireless communication system 304 is configured to receive wireless communications via an antenna 301. The wireless communication system is also configured to generally process the wireless communications by downconverting, digitizing, sampling, and otherwise perform wireless communications receiver and data processing functions. The wireless communications can include data from multiple streams of audio information. The processor 305 receives data 303 from the wireless communication system and separates streams of audio information in the data into three streams of audio information 307, 309, 311. In the illustrated embodiment, one stream of audio information 307 has a first data format and is decompressed by a first decompressor 315. The other two streams of audio information 309, 311 have a second data format and are decompressed by a second decompressor 317. The format module 319 receives audio data from both decompressors and formats the data into a multiple channel audio source. In the illustrated embodiment, the format module 319 produces a multiple channel audio source having 16 channels. In other embodiments, other numbers of channels can be used. The sound generator 321 receives the multi-channel audio output from the format module 319 and generates an analog audio output. The speaker 323 produces sounds in accordance with the analog audio output.

In some embodiments operations of one or both decompressors are performed by the processor, with the processor configured by program instructions to perform decompression of data in a particular compressed format. In some embodiments the format module, or other circuitry on the device, is configured to decompress data in a particular manner, such as data in the first format or data in the second format. For example, in one embodiment the first decompressor is formed of hardware circuitry in the format module and the second decompressor is formed of the processor being configured to perform decompression of the second format by executing program instructions. Thus, decompression by the first decompressor may be provided by specialized hardware circuitry while decompression by the second decompressor may be provided by software executing on a more general purpose processor. The use of both software decompression and hardware decompression, if both are available, may be particularly beneficial as doing so allows for decompression and timely use of quantities of audio information that may exceed decompression capabilities of an available hardware decompressor while not overburdening processing capabilities of a more general purpose processor, which may required for other game processing.

Figure 4:
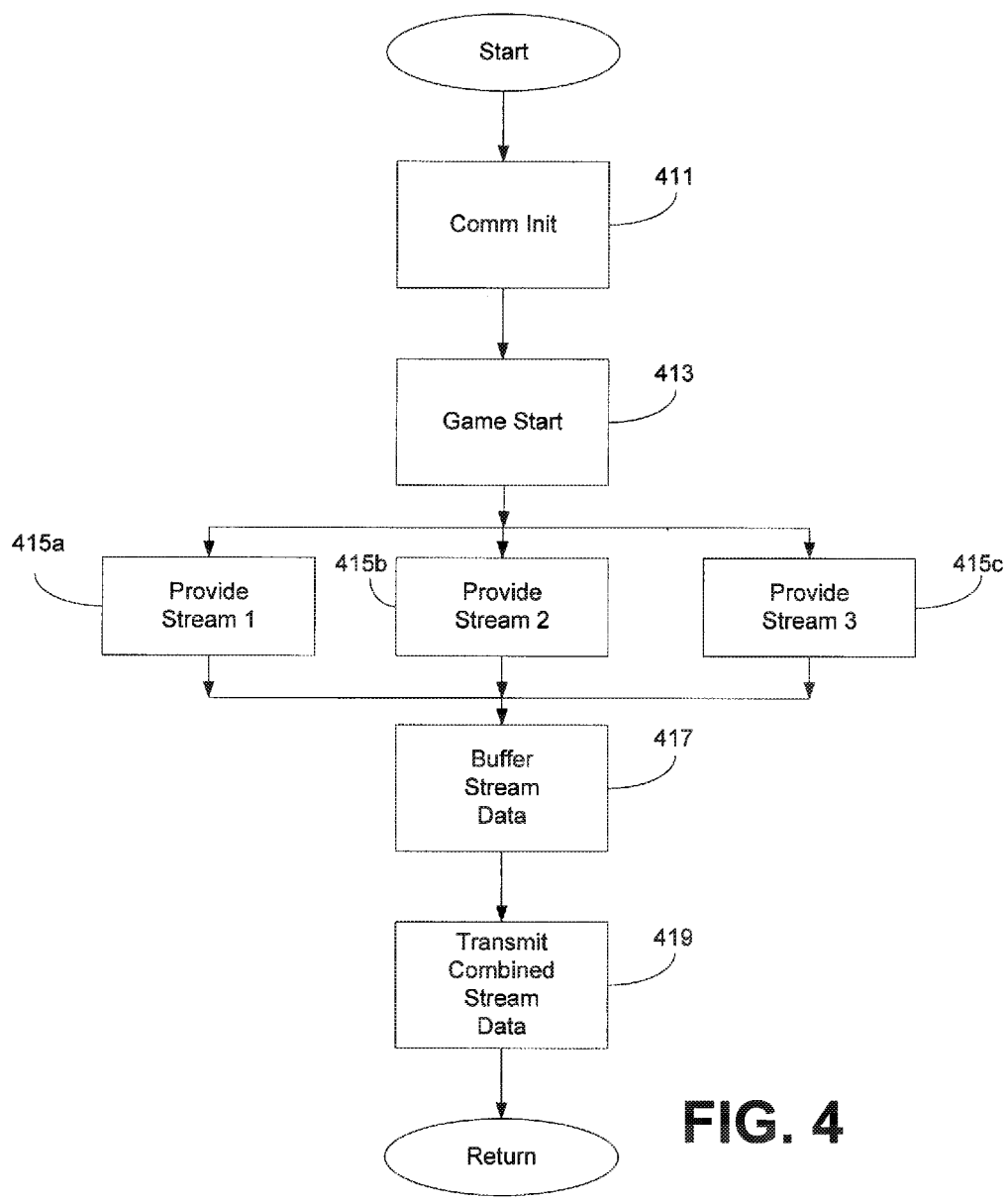
FIG. 4 is a flow diagram of a process for providing a data stream with data of separate audio streams in accordance with aspects of the invention.

FIG. 4 is a flowchart of a process for providing data including multiple audio streams in accordance with aspects of the invention. The process may be performed, for example, by the handheld device of FIG. 1, or at least in part by the system of FIG. 2. In block 411 the process initializes communications between two handheld devices. In some embodiments the operation of block 411 is performed as part of another process. In block 413 the process begins execution of a game, generally by executing program instructions stored in memory. In blocks 415a-c the process provides three streams of audio data at approximately the same time. In some embodiments, different streams of data are provided in at least two different data formats. In some embodiments the different streams of data are retrieved from a game cartridge in different data formats, while in some embodiments the process additionally formats the data from another data format. The process buffers data from the different streams in block 417. The process transmits the buffered data in block 419. The process thereafter returns, although it should be recognized that in many embodiments the operations of blocks 415-419 are generally continually performed for the streams of data until approximate the end of game play.

Figure 5:
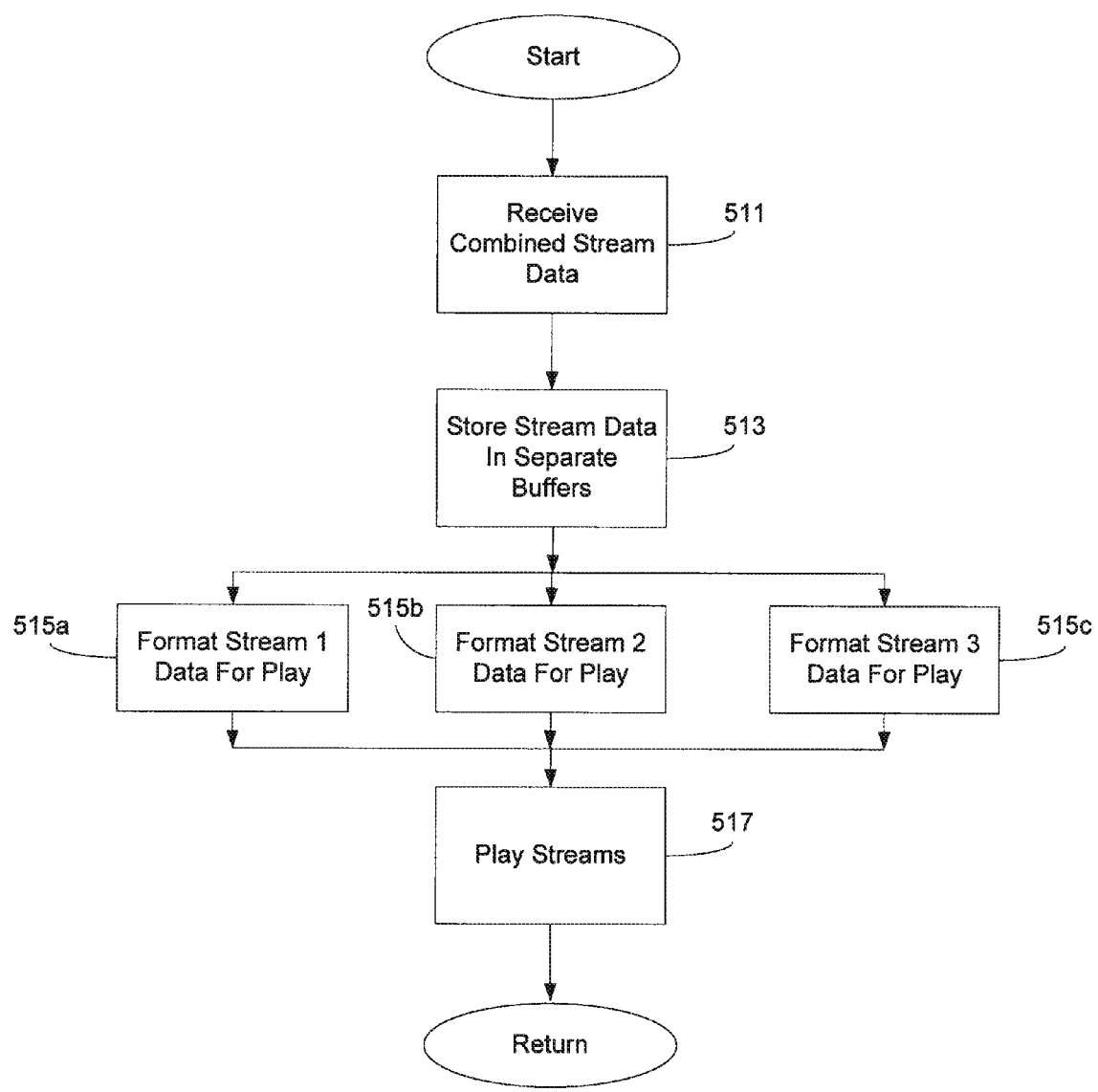
FIG. 5 is a flow diagram of a process for receiving and playing audio data of separate audio streams in accordance with aspects of the invention.

FIG. 5 is a flowchart of a process for receiving and playing data of audio streams in accordance with aspects of the invention. In various embodiments the process may be performed by the handheld device of FIG. 1, or other handheld devices, or the by the system of FIG. 3. The process receives a combined data stream in block 911. For the purposes of discussion of FIG. 5 the combined data stream includes data from three audio streams, although in various embodiments the combined data stream may include data from other numbers of audio streams. In block 513 the process separates and stores the data stream in separate buffers, with data from each of the audio streams in separate buffers. In some embodiments the buffers may be separate physical devices. In most embodiments, however, the buffers are different areas in the same memory device. The process formats data of each of the three data streams for play at approximately the same time in blocks 515a-c. The process plays audio provided by the streams in block 517. The process thereafter returns, although it should be again recognized that the process in most embodiments continually performs operations of the process in a pipelined fashion throughout game play.

Figure 6:
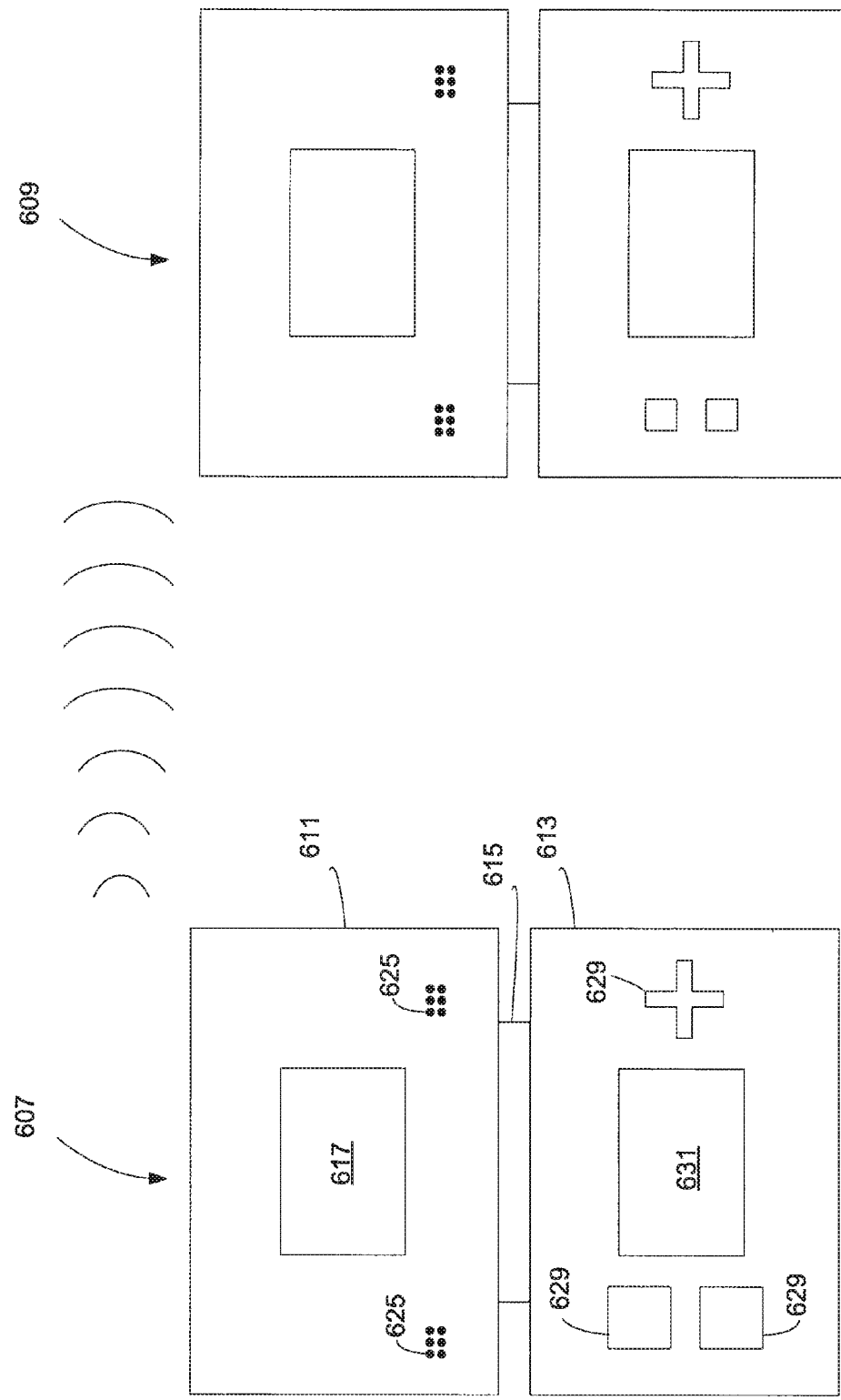
FIG. 6 illustrates a further pair of handheld game devices utilizing wireless data communication to stream audio data in accordance with aspects of the invention.

FIG. 6 illustrates a further embodiment of a first handheld device 607 and a second handheld device 609 in wireless data communication for play of a multiplayer game. The first handheld device includes an upper housing 611 and a lower housing 613, with the upper housing and lower housing coupled by a hinge 615, which includes a passage for electrical coupling of the upper housing and the lower housing. The upper housing includes a video display 617, speakers 625, and a microphone (not shown). The lower housing includes a set of buttons 629 and a touch screen for use as input devices 631. Generally the first handheld device additionally includes power and volume controls, as well as a first memory port and a second memory port, with the first memory port configured to receive a first type of memory cartridge, and the second memory port configured to receive a second type of memory cartridge. Internal to the lower housing of the first handheld device are one or more processors and data buses, video display circuitry and applicable drivers, audio generation circuitry and applicable drivers, wireless communication circuitry, memory for use by the processor and drivers, and other circuitry. In some embodiments the handheld device is a Nintendo DS or Nintendo DS Lite, both widely available in consumer electronics retail outlets.

The first handheld device reads and processes information stored in a game cartridge placed in one of the two memory ports. The information may include, for example, an interactive music game. The processor of the handheld device processes the information and generates display data and audio data using the information. The first handheld device may provide, through execution of program instructions of the information, standalone game play or, in conjunction with another handheld device also executing program instructions, multiplayer game play.

As shown in FIG. 6, the second handheld device has an external and internal hardware configuration similar and generally the same as the first handheld device. The second handheld device may therefore provide for standalone game play or, in conjunction with the first handheld device, provide multiplayer game play. In multiplayer game play, the first handheld device and the second handheld device play the same game substantially simultaneously, with users of the handheld devices competing or collaborating with each other in substantially real time.

In the embodiment of FIG. 6 the second handheld device does not have the same game cartridge as the first handheld device. Instead, the second handheld device is a client of the first handheld device, and downloads, or receives, at least some game components for a game from the first handheld device. As illustrated in FIG. 6, the second handheld device is in data communication with the first handheld device via wireless capabilities. Generally, prior to multiplayer game play, the first and second handheld devices establish data communications, with the first handheld device transferring game executable instructions to the second handheld device. For example, the background and structure of an interactive music game are transferred from the first handheld device to the second handheld device prior to game play. In some embodiments, however, the second handheld device may have the game executable instructions without transfer from the first handheld device, and transfer of game executable instructions may not be performed.

During game play the first handheld device provides audio data to the second handheld device by way of the wireless communication circuitry. The audio data is provided in a streamed fashion during game play, with the audio data being in at least two separate tracks in different data formats. For example, in some embodiments the handheld devices include hardware circuitry for processing data in a first format, and one of the two separate tracks is provided in the first format. In some such embodiments the hardware may only be able to process a predefined quantity of audio data in a given time period, while the processor, or one of multiple processors in the event that the handheld devices include multiple processors, may be able to process additional data substantially simultaneously. The handheld device may also include hardware circuitry for processing data in a second format, and the other of the two separate tracks is provided in the second format. Thus, in either case providing audio data in different formats may increase overall processing of audio information.

Figure 7:
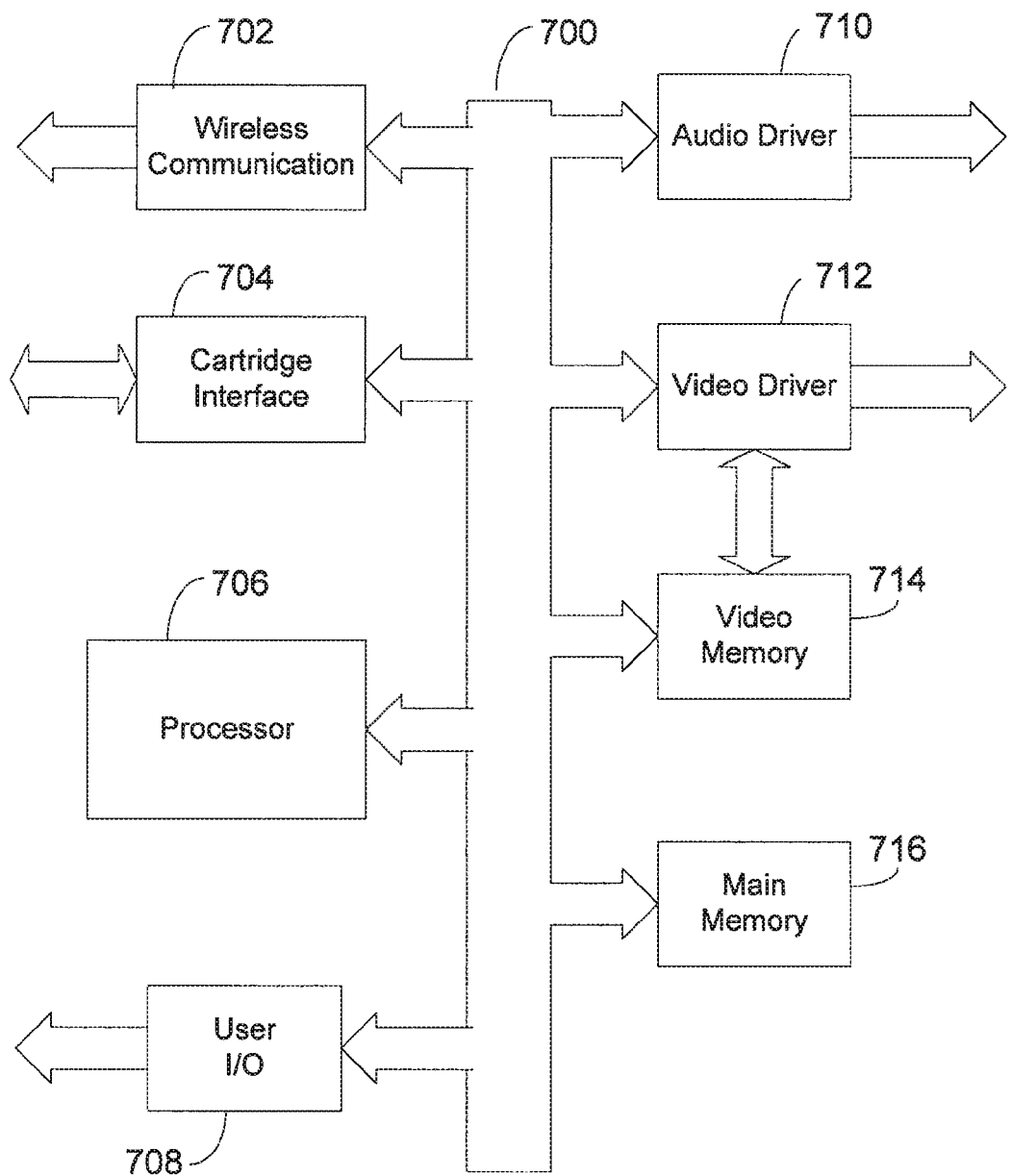
FIG. 7 is a block diagram of a handheld device used in accordance with aspects of the invention.

FIG. 7 is an example of a block diagram of a handheld game device in accordance with one embodiment of the invention. The handheld game device includes a bus 700 coupled to a wireless communication interface 702, a cartridge interface 704, a processor 706, a user input/output (I/O) interface 708, an audio driver 710, a video driver 712, a video memory 714 and a main memory 716. In some embodiments the processor 706 is actually multiple processors, which may have separate data buses. The video driver 712 is coupled directly to the video memory 714.

The handheld game device can communicate wirelessly with other handheld game devices or other computing devices. In one embodiment, the wireless communication interface is configured to use the IEEE 802.11 standard for wireless networks, and may be a Wi-Fi communications interface. In such case, the handheld game device can use other services that might be provided over a Wi-Fi network such as internet services. The cartridge interface is configured to communicate with a game cartridge providing game instructions and game related storage/memory. The processor 706 is configured to communicate with each component coupled to the bus 700 and to execute game instructions. The user I/O interface 708 provides an interface for receiving instructions from a user and providing game display information to the user. The audio driver 710 is configured to receive audio information from a device on the bus and to turn that information into one or more audio signals to be provided to an audio output device such as a speaker. The video driver 712 is configured to provide game display information to the handheld game device user in conjunction with the user I/O interface. The video driver 712 can use the video memory 714 to store the game display information. The processor 706 and/or other devices on the bus 700 use the main memory 716 to store information as needed. The main memory 716 can store information such as game play instructions, user input, audio information, video information and configuration information. The main memory 716 can include both volatile and non-volatile memory.

Figure 8:
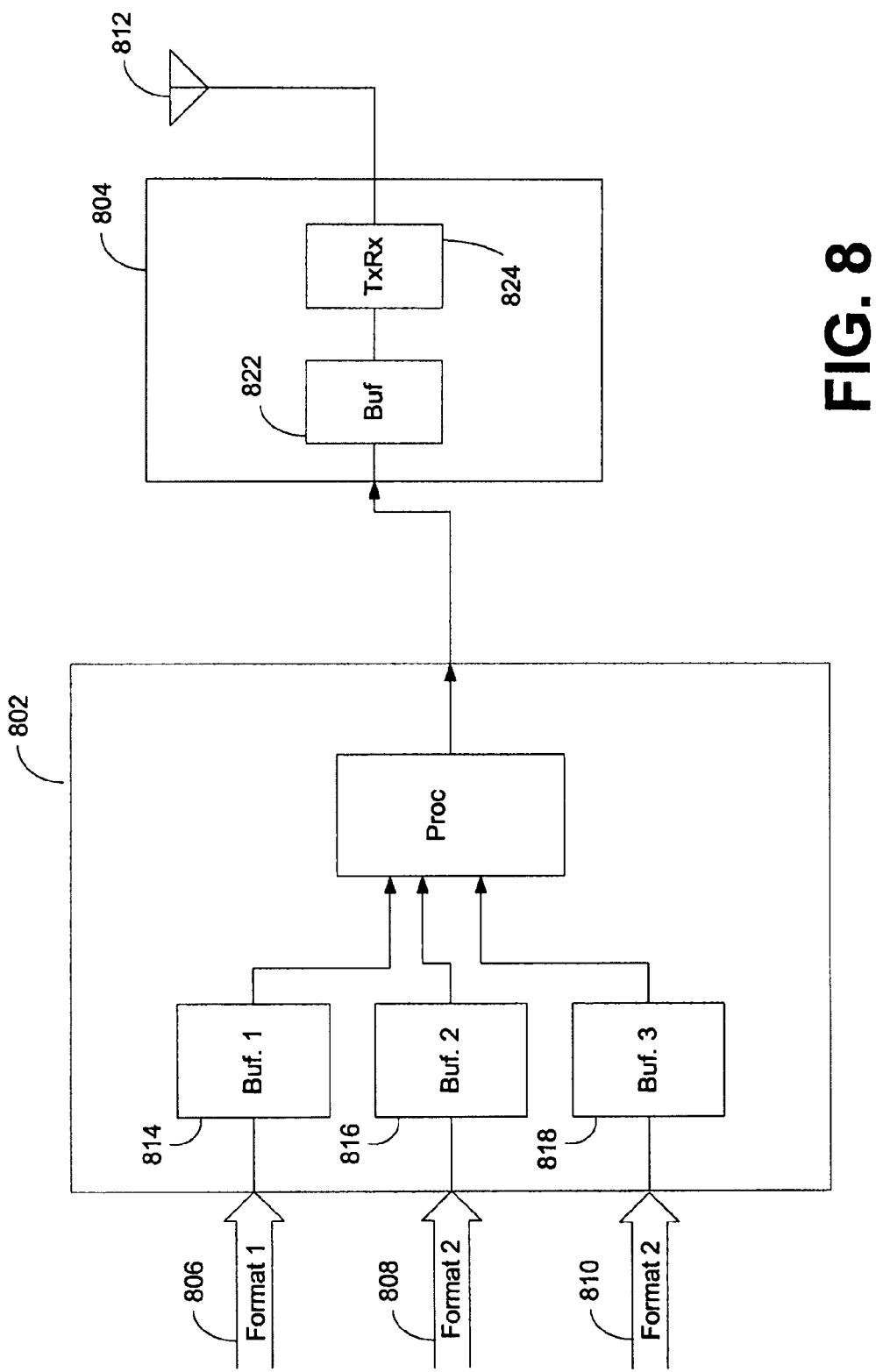
FIG. 8 is a block diagram of a further embodiment of host circuitry relating to streaming of audio data in different formats in accordance with aspects of the invention.

FIG. 8 is a partial block diagram of a further embodiment of host system, particularly as it relates to audio streaming, in accordance with aspects of the invention. The host system includes a processing system 802 and a wireless communication system 804. The processing system 802 receives a first audio stream 806, a second audio stream 808 and a third audio stream 810. Data of audio stream 806 is in a first format while data of audio streams 808 and 810 are in a second format. Processing system 802 includes three buffers 814, 816, 818 and a processor 820. Buffer 814 is coupled to audio stream 806, buffer 816 is coupled to audio stream 808 and buffer 818 is connected to audio stream 810. Buffers 814, 816 and 818 are also coupled to processor 820.

Wireless communication system 804 includes a buffer 822, a transceiver 824 and an antenna 812. Buffer 822 is coupled to the processing system 802 and to transceiver 824. Transceiver 824 is coupled to antenna 812.

In operation, the host system, or a portion of the host system, receives audio data in a first format and a second format. In the illustrated embodiment, the first format is ADPCM and the second format is Ogg. Each audio stream is received by the processing system and stored in a buffer. In the illustrated embodiment, audio stream 806 (ADPCM data) is stored in buffer 814 and audio streams 808 and 810 (Ogg data) are stored in buffers 816 and 818, respectively. Processor 820 retrieves audio data from buffers 814, 816 and 818 and combines the audio data into a single data stream. Data from the single data stream can be stored in buffer 822 within the wireless communication system 804. The transceiver 824 can retrieve data from the buffer 822 and send it wirelessly via the antenna 812, with the transceiver sending the data in packets conforming to an IEEE 802.11 standard for wireless networks.

In one embodiment, Ogg data received by the processing system at 15 KHz, resulting in a stream data rate of approximately 2.5 Kbps per stream. In one embodiment, buffer 814 (ADPCM buffer) has a capacity of 25 kilobytes (Kb) and buffers 816 and 818 (Ogg buffers) have a capacity of 10 Kb. In one embodiment, the transceiver sends 512 byes of data per frame, comprised in part of audio data, with roughly corresponding to 60 frames per second. In such case, 128 bytes of the 512 bytes may be Ogg data, which is generally sufficient to seamlessly play Ogg data as 86 bytes per frame are generally necessary to play Ogg data seamlessly on, for example, a handheld game device. Also, in this one embodiment, another 128 bytes of the 512 bytes can be ADPCM data. In one embodiment, one audio stream corresponds to the bass part of a song, a second audio stream corresponds to the guitar part of the song, and a third audio stream corresponds to all other sounds in the song.

In one embodiment, different audio stream formats can be used for any of the audio streams. In another embodiment, more than two types of audio streams can be used. In one embodiment, other buffer sizes can be used for any of the buffers. In other embodiments, less than or more than three buffers can be used. In one embodiment, a different wireless communication standard can be used. In such case, the processor can compose, and the transceiver can send, packets in accordance with the alternative wireless communication standard. In one embodiment, the processing system can be implemented using one or more Advanced RISC Machine (ARM) type processors, multiple random access memories (RAMs) and other appropriate circuitry. In another embodiment, the processing system can include any number of FPGAs, PLDs, CPLDs, RAMs and/or logic circuits.

Figure 9:
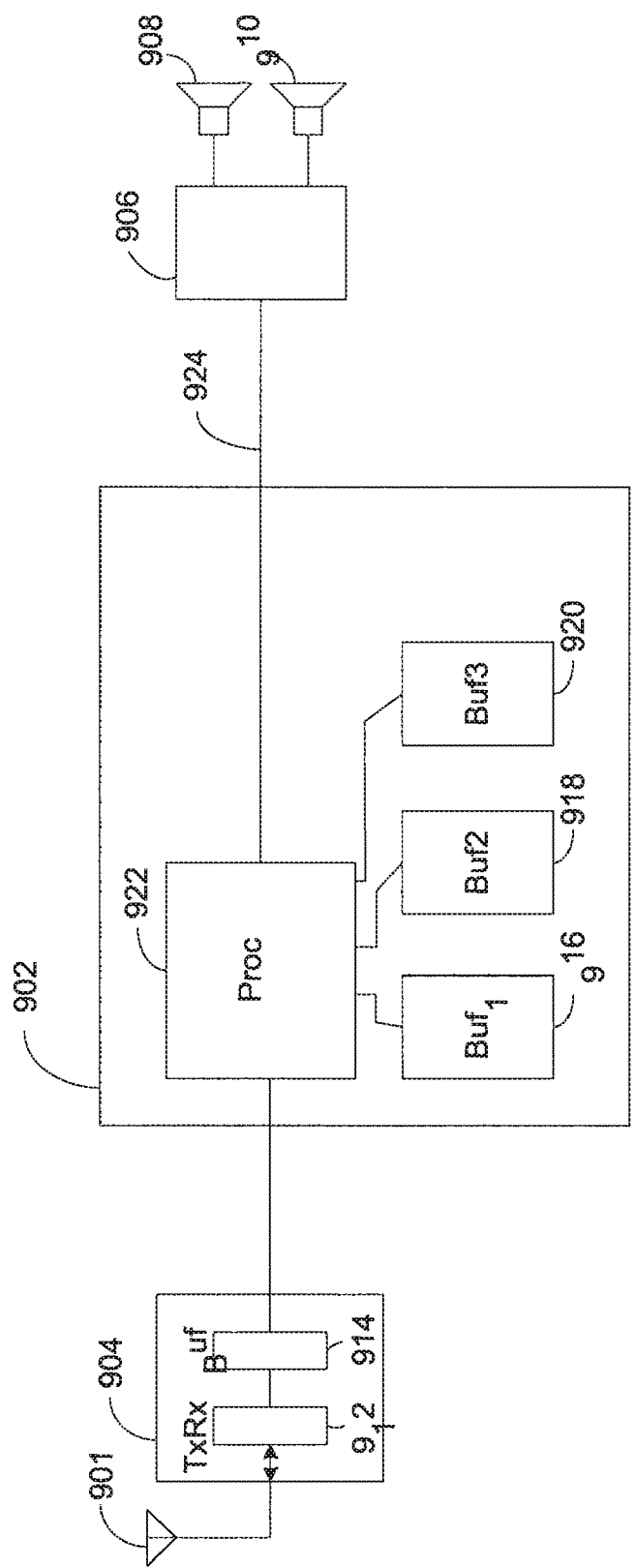
FIG. 9 is a block diagram of a further embodiment of client circuitry relating to receiving and playing streams of audio data in accordance with aspects of the invention.

FIG. 9 is a partial block diagram of a further client system, particularly as it relates to audio streaming, in accordance with aspects of the invention. The audio stream receiver system includes a wireless communication system 904, a processing system 902, a sound generator 906 and two speakers 908, 910. The wireless communication system 904 includes an antenna 901, a transceiver 912 and a buffer 914. The antenna 901 is coupled to the transceiver 912 which is coupled to buffer 914. Processing system 902 includes a processor 922 and three buffers 916, 918, 920. Processor 922 is coupled to buffer 914 of the wireless communication system 904 and to buffer 916, buffer 918 and buffer 920. Processor 922 is also coupled to sound generator 906 via link 924. Link 924 includes 16 digital channels where each channel relates to audio content. Sound generator 906 is connected to two speakers 908, 910.

In operation, transceiver 912 receives data via antenna 901. The data may be, for example, in accordance with an 802.11 wireless communication standard. The transceiver stores the data in buffer 914. Processor 922 retrieves the stored data from buffer 914, parses the data (stream), and separates it into the three underlying audio data streams, including a first stream (ADPCM) and two second streams (Ogg). Each audio stream is stored in a respective buffer. The processor 922 decompresses the audio data from each stream using the appropriate decompression process (e.g. ADPCM or Ogg decompression processes). The processor 922 combines the three streams of audio data into 16 audio data channels and outputs the 16 audio data channels via link 924 to sound generator 906. Sound generator 906 processes the 16 channels of digital audio data and generates two analog audio outputs. Speakers 908 and 910 receive the analog audio outputs and produce sound.

In one embodiment, different audio stream formats can be used. In another embodiment, more than two types of audio streams can be used. In one embodiment, the buffers of processing system 902 mirror the buffers of processing system

802 (FIG. 8). In one embodiment, other buffer sizes can be used for any of the buffers. In one embodiment, a different wireless communication standard can be used. In such case, the transceiver can receive, and the processor can process, packets in accordance with the alternative wireless communication standard. In one embodiment, the processing system can be implemented using one or more Advanced RISC Machine (ARM) type processors, multiple random access memories (RAMs) and other appropriate circuitry. In another embodiment, the processing system can include any number of FPGAs, PLDs, CPLDs, RAMs and/or logic circuits. In one embodiment, less than or more than two speakers can be used. In one embodiment, more than or less than 16 audio data channels can be used to provide the audio data from the processing system to the sound generator. In one embodiment, no sound generator is used and the processing system outputs one or more analog audio signals.

Figure 10:
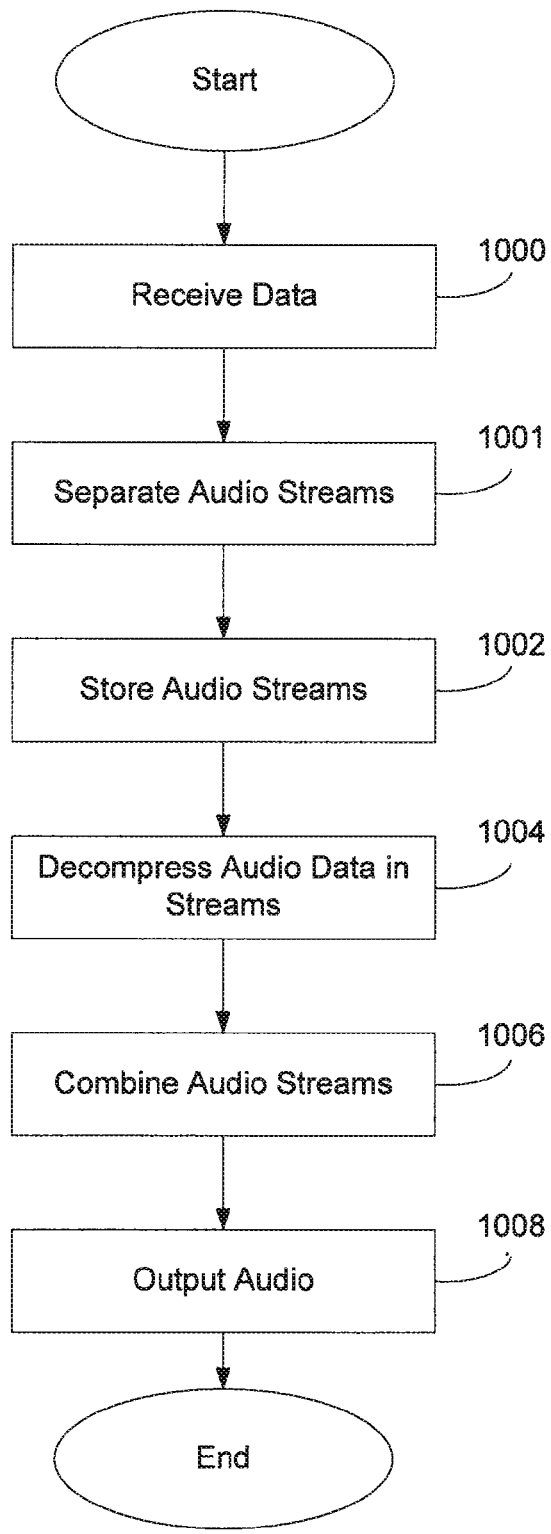
FIG. 10 is a flow diagram of a further embodiment of a process for processing a data stream with data of separate audio streams in accordance with aspects of the invention.

FIG. 10 is a flowchart illustrating a method for operating a processor in accordance with aspects of the invention. The processor may be, for example, the processor of the system of FIG. 9. In block 1000 the processor receives data from, for example, the wireless system 904 of FIG. 9. The processor separates the received data into audio streams. In block 1002 the processor stores the audio streams. In block 1004 the processor decompresses the audio data in the streams using the appropriate decompression processing. In block 1006 the processor combines the audio streams 1006. In block 1008 the processor outputs a combined audio stream. In one embodiment the combined audio stream output includes 16 channels of audio data. In other embodiments, the processing system outputs one or more analog audio signals indicative of the combined audio stream.

The invention provides for streaming data, such as music data, during game play. Although the invention has been described with respect to certain specific embodiments, it should be recognized that the invention may be practiced other than as specifically discussed, the invention including the claims and their insubstantial variations supported by this disclosure.

What is claimed is:

1. A method for providing audio information from a first handheld device to a second handheld device during game play of an interactive multiplayer video game engaged in by users of the first handheld device and the second handheld device, the first handheld device configured to execute program instructions of the interactive multiplayer video game and the second handheld device also configured to execute program instructions of the interactive multiplayer video game, each of the first handheld device and the second handheld device having wireless communications capability, comprising:

executing at least some program instructions of the interactive multiplayer video game by the first handheld device;

transmission of at least some audio information including a portion of a song by the wireless communications capability of the first handheld device;

executing at least some program instructions of the interactive multiplayer video game by the second handheld device;

reception by the wireless communications capability of the second handheld device of the at least some audio information transmitted by the wireless communication capability of the first handheld device, the reception occurring after the second handheld device has executed at least some of the program instructions of the interactive multiplayer video game;

providing an audio presentation by the second handheld device of the portion of the song received by the second handheld device; and executing at least some further program instructions of the interactive multiplayer video game by the first handheld device, the execution of the at least some further program instructions occurring after the transmission of the at least some audio information by the wireless communications capability of the first handheld device.

2. The method of claim 1 wherein the at least some program instructions of the interactive multiplayer video game and the at least some further program instructions of the interactive multiplayer video game are the same program instructions.

3. The method of claim 1 wherein the interactive multiplayer video game is a multiplayer music game.

4. A method for providing audio information from a first handheld device to a second handheld device during game play of an interactive multiplayer video game engaged in by users of the first handheld device and the second handheld device, the first handheld device configured to execute program instructions of the interactive multiplayer video game and the second handheld device also configured to execute program instructions of the interactive multiplayer video game, each of the first handheld device and the second handheld device having wireless communications capability, comprising:

executing at least some program instructions of the interactive multiplayer video game by the first handheld device;

transmission of at least some audio information including a song by the wireless communications capability of the first handheld device;

executing at least some program instructions of the interactive multiplayer video game by the second handheld device;

reception by the wireless communications capability of the second handheld device of the at least some audio information including the song transmitted by the wireless communication capability of the first handheld device, the reception occurring after the second handheld device has executed at least some of the program instructions of the interactive multiplayer video game;

providing an audio presentation by the second handheld device of the at least some audio information including the song received by the second handheld device; and executing at least some further program instructions of the interactive multiplayer video game by the first handheld device, the execution of the at least some further program instructions occurring after the transmission of the at least some audio information by the wireless communications capability of the first handheld device, wherein the at least some audio information including the song includes some portions of the song in a first data format and some other portions of the song in a second data format, with the portions of the song in the first data format and the other portions of the song in the second data format being streamed substantially simultaneously.

5. The method of claim 4, wherein the at least some audio information is provided in separate audio tracks.

6. The method of claim 4, wherein the first data format is Ogg Vorbis data format and the second data format is adaptive differential pulse code modulation (ADPCM) format.

7. A method for providing audio information from a first handheld device to a second handheld device during game play of an interactive multiplayer video game engaged in by users of the first handheld device and the second handheld device, the first handheld device configured to execute program instructions of the interactive multiplayer video game and the second handheld device also configured to execute program instructions of the interactive multiplayer video game, each of the first handheld device and the second handheld device having wireless communications capability, comprising:

executing at least some program instructions of e interactive multiplayer video game by the first handheld device;

transmission of at least some audio information by the wireless communications capability of the first handheld device;

executing at least some program instructions of the interactive multiplayer video game by the second handheld device;

reception by the wireless communications capability of the second handheld device of the at least some audio information transmitted by the wireless communication capability of the first handheld device, the reception occurring after the second handheld device has executed at least some of the program instructions of the interactive multiplayer video game;

providing an audio presentation by the second handheld device of the at least some audio information received by the second handheld device; and executing at least some further program instructions of the interactive multiplayer video game by the first handheld device, the execution of the at least some further program instructions occurring after the transmission of the at least some audio information by the wireless communications capability of the first handheld device, the interactive multiplayer video game is a multiplayer music game in which users of the handheld devices simulate play of a song in accordance with instructions to the users of the handheld devices and the at least some audio information comprises portions of the song;

providing instructions to a user of the second handheld device to simulate play of the song, the instructions indicating to the user of the second handheld device timing and operation of input devices of the second handheld device;

not providing the audio presentation by the second handheld device of the at least some audio information received by the second handheld device if the second handheld device determines in accordance with program instructions of the multiplayer music game that the user of the second handheld device has not simulated play of the song in accordance with the instructions; and transmission of further audio information by the wireless communications capability of the first handheld device substantially throughout play of the interactive multiplayer video game by the first handheld device.

8. A method for providing audio information from a first handheld device during game play of an interactive multiplayer video game engaged in by a user of the first handheld device, the first handheld device configured to execute program instructions of the interactive multiplayer video game, the first handheld device having wireless communications capability, comprising:

executing at least some program instructions of the interactive multiplayer video game by the first handheld device;

transmission of at least some audio information including a portion of a song by the wireless communications capability of the first handheld device; and executing at least some further program instructions of the interactive multiplayer video game by the first handheld device, the execution of the at least some further program instructions occurring after the transmission of the at least some audio information by the wireless communications capability of the first handheld device.

9. A method for providing audio information from a first handheld device during game play of an interactive multiplayer video game engaged in by a user of the first handheld device, the first handheld device configured to execute program instructions of the interactive multiplayer video game, the first handheld device having wireless communications capability, comprising:

executing at least some program instructions of the interactive multiplayer video game by the first handheld device;

transmission of at least some audio information including a song by the wireless communications capability of the first handheld device; and executing at least some further program instructions of the interactive multiplayer video game by the first handheld device, the execution of the at least some further program instructions occurring after the transmission of the at least some audio information by the wireless communications capability of the first handheld device, wherein the at least some audio information of the song includes some portions of the audio information in a first data format and some other portions of the audio information in a second data format.

* * * * *

UNITED STATES PATENT AND TRADEMARK OFFICE
CERTIFICATE OF CORRECTION

PATENT NO. : 8,409,006 B2  
APPLICATION NO. : 11/864785  
DATED : April 2, 2013  
INVENTOR(S) : Oberg et al.

Page 1 of 1

It is certified that error appears in the above-identified patent and that said Letters Patent is hereby corrected as shown below:

In the Claims:

In column 13, line 8, delete "e" and insert --the--, therefor.

Signed and Sealed this
Seventeenth Day of September, 2013

Teresa Stanek Rea
*Deputy Director of the United States Patent and Trademark Office*